(12) United States Patent
Park

(10) Patent No.: US 8,061,745 B2
(45) Date of Patent: Nov. 22, 2011

(54) MULTI-PURPOSE SPADE

(76) Inventor: Hyun C. Park, Phelan, CA (US)

( * ) Notice: Subject to any disclaimer, the term of this patent is extended or adjusted under 35 U.S.C. 154(b) by 230 days.

(21) Appl. No.: 12/479,481

(22) Filed: Jun. 5, 2009

(65) Prior Publication Data

US 2010/0308608 A1 Dec. 9, 2010

(51) Int. Cl.
*A01B 1/02* (2006.01)
(52) U.S. Cl. .............. 294/51; 294/49; 294/56; 294/59
(58) Field of Classification Search .......... 294/49, 294/51, 56, 59; 172/372, 375, 381
See application file for complete search history.

(56) References Cited

U.S. PATENT DOCUMENTS

| | | | | | |
|---|---|---|---|---|---|
| 348,161 | A | * | 8/1886 | Gregg | 294/49 |
| 366,099 | A | * | 7/1887 | Hinchman | 294/56 |
| 421,117 | A | * | 2/1890 | Voltz | 403/23 |
| 808,168 | A | * | 12/1905 | Reed | 294/49 |
| 809,840 | A | * | 1/1906 | Peisker | 294/49 |
| 1,209,248 | A | * | 12/1916 | Beall | 294/49 |
| 1,437,199 | A | * | 11/1922 | Same | 30/314 |
| 1,571,818 | A | * | 2/1926 | Ternan et al. | 294/49 |
| 4,655,494 | A | * | 4/1987 | Eads et al. | 294/49 |
| 5,529,130 | A | * | 6/1996 | Suk | 172/380 |

* cited by examiner

*Primary Examiner* — Dean Kramer
(74) *Attorney, Agent, or Firm* — John K. Park; Park Law Firm

(57) ABSTRACT

A multi-purpose spade includes a central plate, first and second edge plates, and a retreating crescent blade. The central plate is generally concave. The retreating crescent blade is formed along the tip portions of the central plate and the first and second plates. The inner edge portions of the first and second plates are connected to corresponding side portions of the central plate with a predetermined angle so as to form two crest portions on the front surfaces along the side portions of the central plate. The multi-purpose spade may further comprise an extending blade configured to be connected to the retreating crescent blade.

12 Claims, 10 Drawing Sheets

– Prior Art –

MULTI-PURPOSE SPADE

BACKGROUND OF THE INVENTION

The present invention relates to a multi-purpose spade. More particularly, this invention relates to a multi-purpose spade that comprises a detachable tip and a crescent blade.

Conventional trowel with a pointed tip in FIG. 12 has problems in using. When used in transplanting, it tends to hurt roots of plants.

Similar problems hold true for the other types of spades.

SUMMARY OF THE INVENTION

The present invention contrives to solve the disadvantages of the prior art.

An objective of the invention is to provide a multi-purpose spade.

Another objective of the invention is to provide a multi-purpose spade with a crescent blade.

Still another objective of the invention is to provide a multi-purpose spade with a detachable tip.

Still another objective of the invention is to provide a multi-purpose spade with edges suitable for cutting.

In order to achieve the above objectives, the present invention provides a multi-purpose spade.

A multi-purpose spade comprises a central plate, first and second edge plates, and a retreating crescent blade.

The central plate comprises top surface and bottom surfaces, side portions, tip portion, and a treading portion, and the central plate is generally concave.

The first edge plate comprises top and bottom surfaces, a first edge portion, an inner side portion, a tip portion, and a treading portion.

The second edge plate comprises top and bottom surfaces, a second edge portion, an inner side portion, a tip portion, and a treading portion.

The retreating crescent blade is formed along the tip portions of the central plate and the first and second plates.

The inner edge portions of the first and second edge plates are connected to corresponding side portions of the central plate with a predetermined angle so as to form two crest portions on the front surfaces along the side portions of the central plate.

The central plate may be approximately 2.0 to 7.0 times as wide as one of the first and second edge plates. The central plate may be approximately 5.0 times as wide as one of the first and second edge plates.

The portion of the central plate may be convex. The multi-purpose spade may further comprise a handle acceptor and a handle. The handle acceptor is provided around a middle point of the treading portion of the central plate. The handle is fixed to the handle acceptor. The handle acceptor may extend from the convex portion of the central plate.

The first edge portion of the first edge plate may extend generally in a direction parallel to a line connecting tips of the two crest portions.

The second edge portion of the second edge plate may extend generally in a direction parallel to a line connecting tips of the two crest portions.

At least one of the first and second edge plates may comprise a sharp edge along the first or second edge portion configured for cutting branches or roots of weeds, flowers, vegetables, and trees.

At least one of the first and second edge plates may comprise a plurality of saw-teeth along the first or second edge portion configured for cutting weeds or branches.

The central plate, the first and second edge plates, and the retreating crescent blade may be integrated into a single body.

The retreating crescent blade may comprise two pointed tips on both sides thereof.

The multi-purpose spade may further comprise an extending blade configured to be connected to the retreating crescent blade, and the extending blade may comprise a connecting edge.

The extending blade may comprise an accepting slot between the top and bottom surfaces along the connecting edge, and the accepting slot may be configured to accept the retreating crescent blade.

The accepting slot may comprise a plurality of first mechanical fasteners along the top and bottom surfaces. The retreating crescent blade may comprise a plurality of second mechanical fasteners. The first mechanical fasteners may comprise a plurality of first holes. The second mechanical fasteners may comprise a plurality of second holes.

The multi-purpose spade may further comprise a plurality of bolts and nuts for fastening the plurality of first holes and the plurality of second holes.

Alternatively, the second mechanical fastener may comprise locking bolt extending from the top surface of the central plate or the first and second edge plate, and the first mechanical fastener comprises an L-shaped locking slot on the top surface of the connecting edge, such that the locking bolt is configured to slide into the L-shaped locking slot and rotate by a predetermined angle to lock in.

Another aspect of the invention provides a multi-purpose spade comprising:

a central plate comprising top surface and bottom surfaces, side portions, tip portion, and a treading portion, wherein the central plate is generally concave;

a first edge plate comprising top and bottom surfaces, a first edge portion, an inner side portion, a tip portion, and a treading portion;

a second edge plate comprising top and bottom surfaces, a second edge portion, an inner side portion, a tip portion, and a treading portion;

a retreating crescent blade formed along the tip portions of the central plate and the first and second plates; and an extending blade configured to be connected to the retreating crescent blade, wherein the extending blade comprises a connecting edge, and wherein the extending blade comprises an accepting slot between the top and bottom surfaces along the connecting edge, and wherein the accepting slot is configured to accept the retreating crescent blade, wherein the inner edge portions of the first and second plates are connected to corresponding side portions of the central plate with a predetermined angle so as to form two crest portions on the front surfaces along the side portions of the central plate.

The advantages of the present invention are: (1) the multi-purpose spade provides crescent blade and sharp points suitable for cutting; (2) the multi-purpose spade provides a replaceable blade; and (3) the multi-purpose spade provides side blade or saw-teeth.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

FIGS. 1-11 show multiple-purpose spades according to embodiments of the invention.

Figure 12:
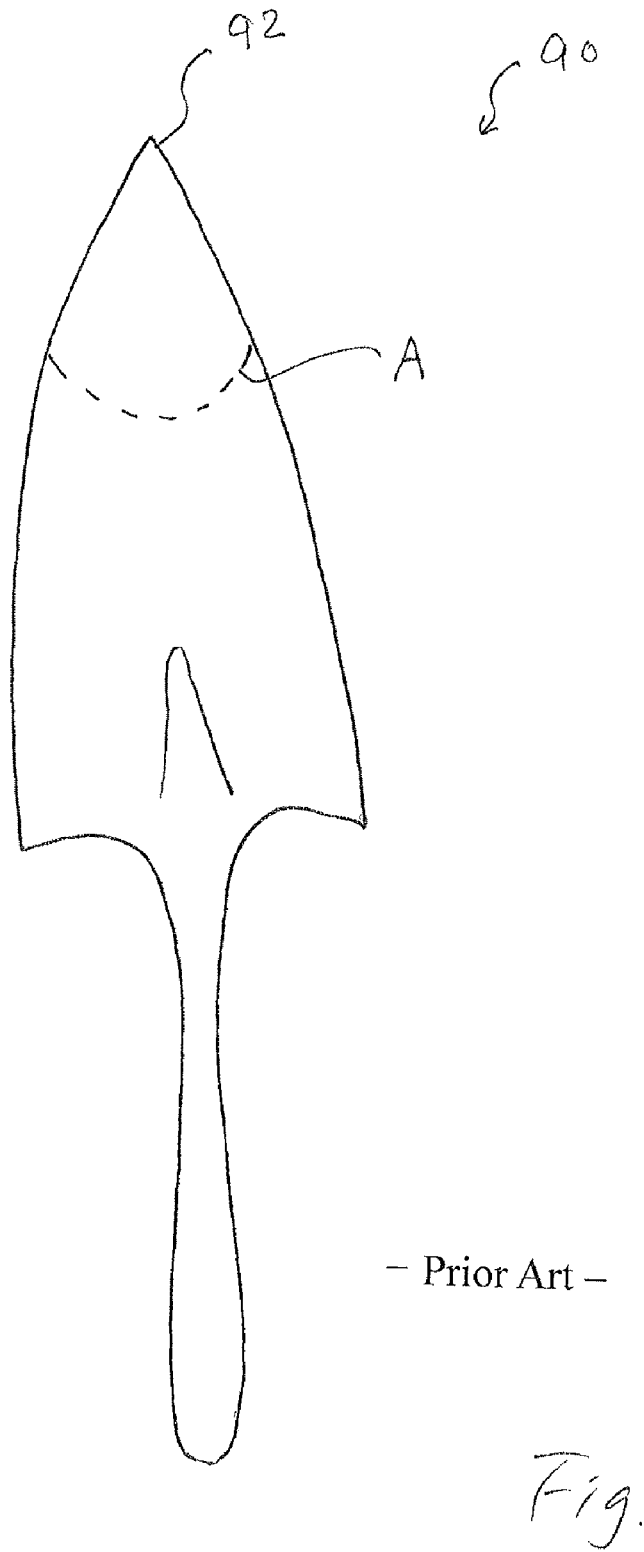
FIG. 12 is a perspective view of a trowel showing a pointed tip.

As shown in FIG. 12, the conventional trowel 90 has a pointed tip 92. The problems with such a conventional one can be solved by cutting the point tip along a crescent line A.

In certain embodiments, such a cutout can be replaceable. Since it is the portion which receives most of the strain or degrading force from the work, the tip is the first portion that is degraded.

An aspect of the present invention provides a multi-purpose spade 100.

The multi-purpose spade 100 comprises a central plate 10, first and second edge plates 20, 30, and a retreating crescent blade 40.

Figure 2:
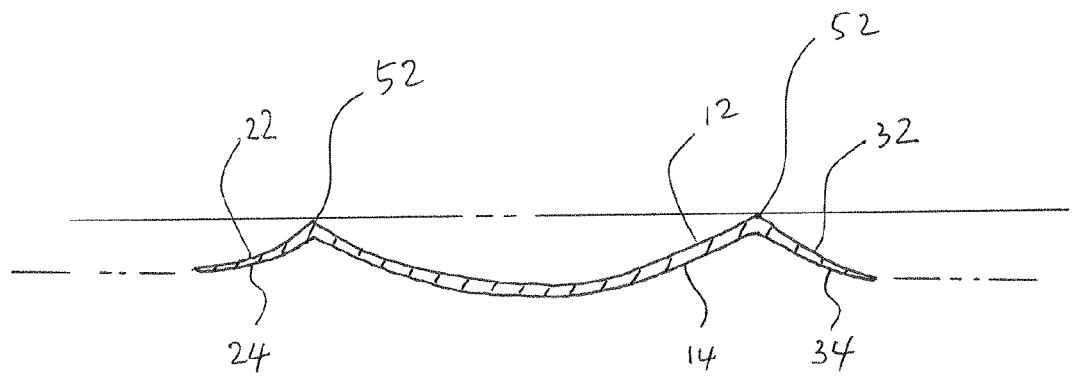
FIG. 2 is a cross-sectional view along line II-II in FIG. 1.
Figure 3:
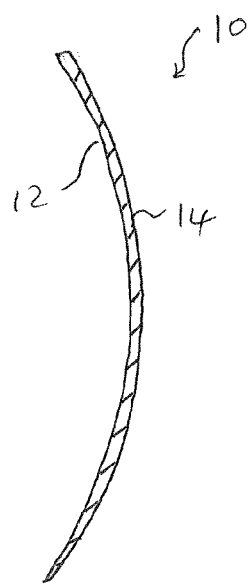
FIG. 3 is a cross-sectional view along line III-III in FIG. 1.

The central plate 10 comprises top surface and bottom surfaces 12, 14, side portions 16, tip portion 18, and a treading portion 19, and the central plate 10 is generally concave as shown in FIG. 2.

The first edge plate 20 comprises top and bottom surfaces 22, 24, a first edge portion 25, an inner side portion 26, a tip portion 28, and a treading portion 29.

The second edge plate 30 comprises top and bottom surfaces 32, 34, a second edge portion 35, an inner side portion 36, a tip portion 38, and a treading portion 39.

The retreating crescent blade 40 is formed along the tip portions 18, 28, 38 of the central plate 10 and the first and second plates 20, 30.

The inner edge portions 26, 36 of the first and second edge plates 20, 30 are connected to corresponding side portions 16 of the central plate 10 with a predetermined angle so as to form two crest portions 52 on the front surfaces 22, 32 along the side portions 16 of the central plate 10 as shown in FIG. 2.

The central plate 10 may be approximately 2.0 to 7.0 times as wide as one of the first and second edge plates 20, 30. The central plate 10 may be approximately 5.0 times as wide as one of the first and second edge plates 20, 30.

Figure 1:
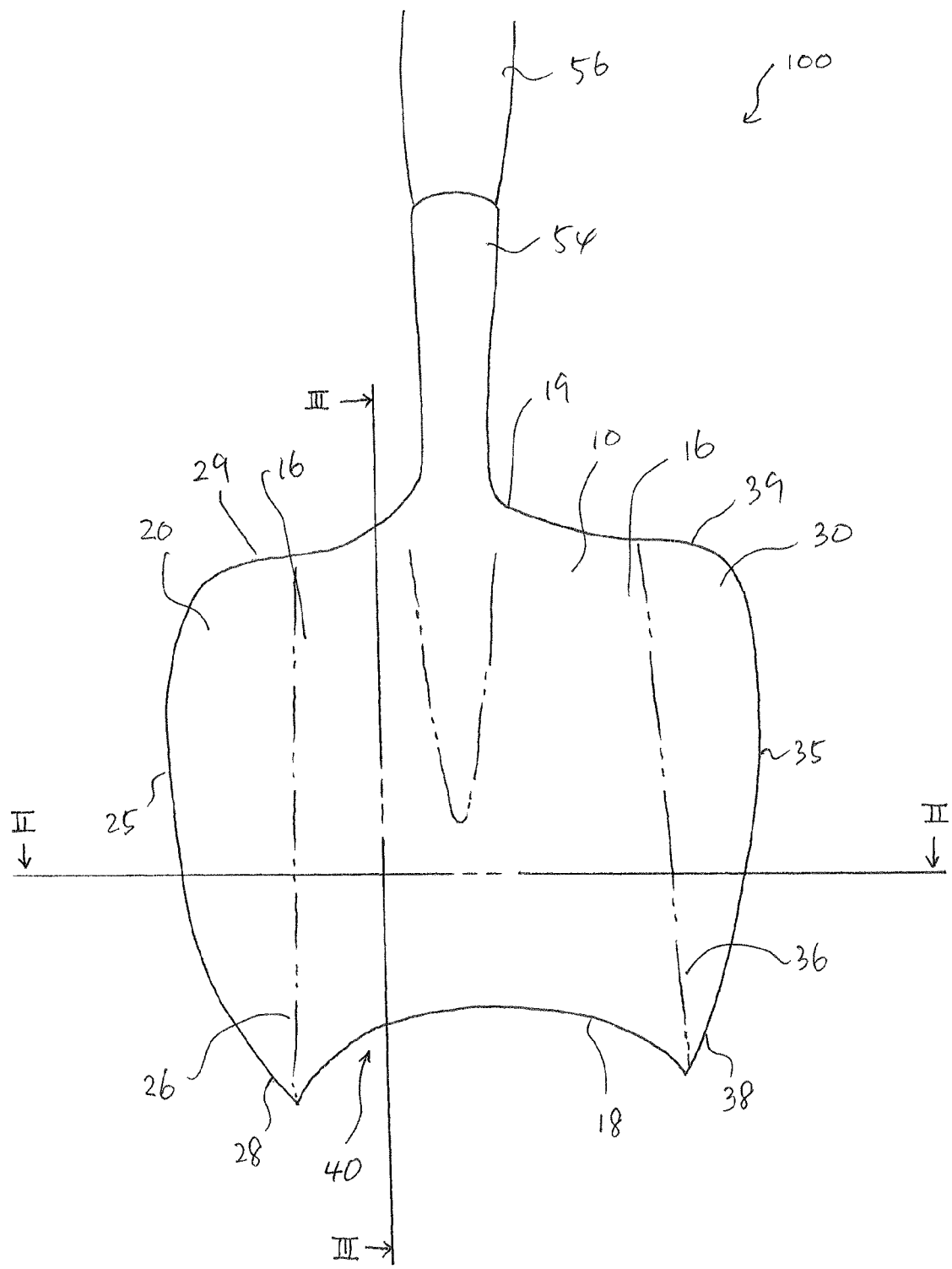
FIG. 1 is a front plan view showing a multi-purpose spade according to the present invention.

At least a portion of the central plate 10 may be convex as shown in FIG. 1. The multi-purpose spade 100 may further comprise a handle acceptor 54 and a handle 56. The handle acceptor 54 is provided around a middle point of the treading portion 19 of the central plate 10. The handle 56 is fixed to the handle acceptor 54. The handle acceptor 54 may extend from the convex portion 17 of the central plate 10 as shown in FIG. 5.

The first edge portion 25 of the first edge plate 20 may extend generally in a direction parallel to a line connecting tips of the two crest portions 52 as shown in FIG. 2.

The second edge portion 35 of the second edge plate 30 may extend generally in a direction parallel to a line connecting tips of the two crest portions 52.

Figure 5:
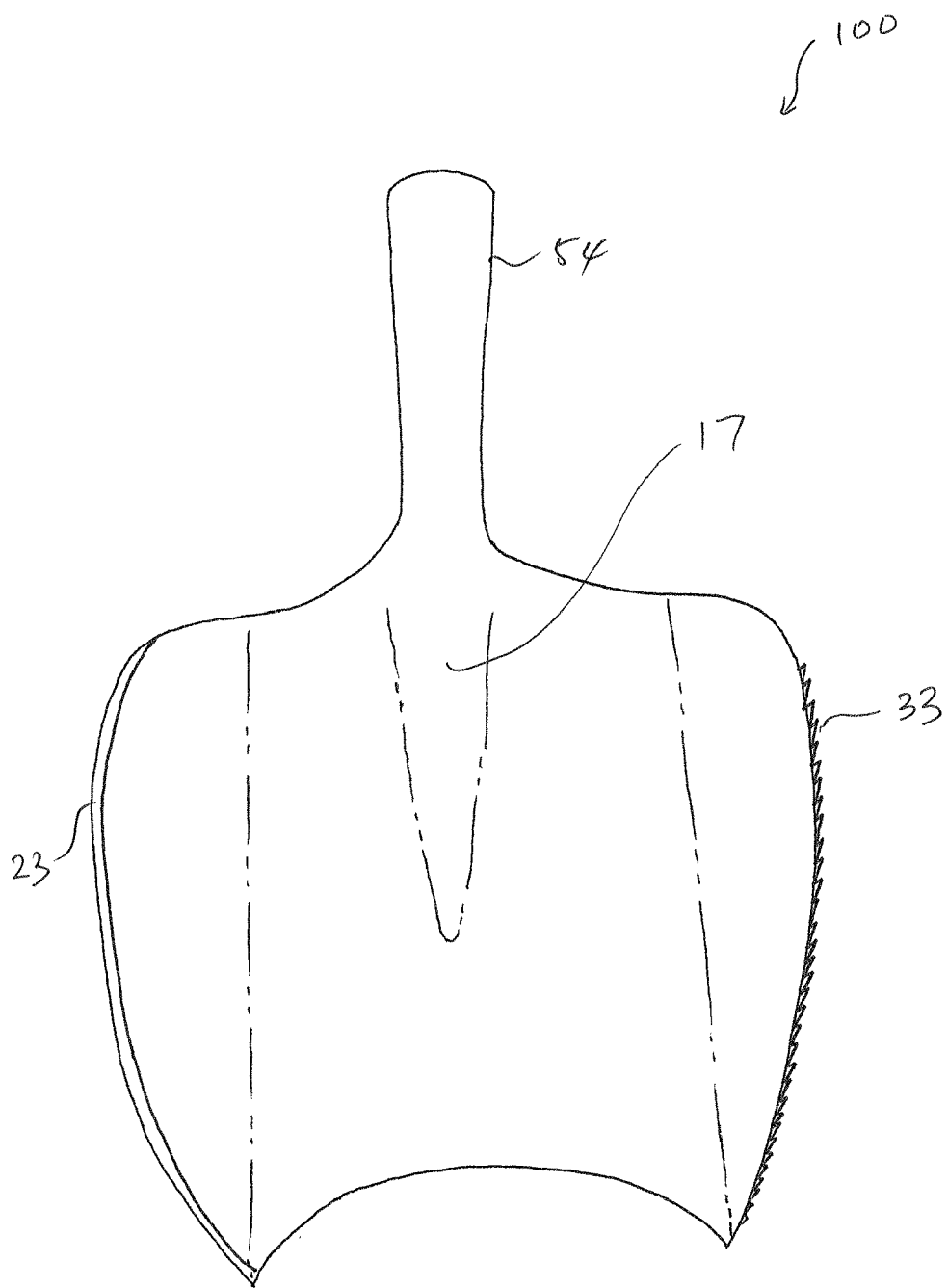
FIG. 5 is a front plan view showing a side blade and a side saw-teeth.

At least one of the first and second edge plates 20, 30 may comprise a sharp edge 23 along the first or second edge portion 25, 35 configured for cutting weeds or branches as shown in FIG. 5.

At least one of the first and second edge plates 20, 30 may comprise a plurality of saw-teeth 33 along the first or second edge portion 25, 35 configured for cutting weeds or branches as shown in FIG. 5.

The central plate 10, the first and second edge plates 20, 30, and the retreating crescent blade 40 may be integrated into a single body.

Figure 4:
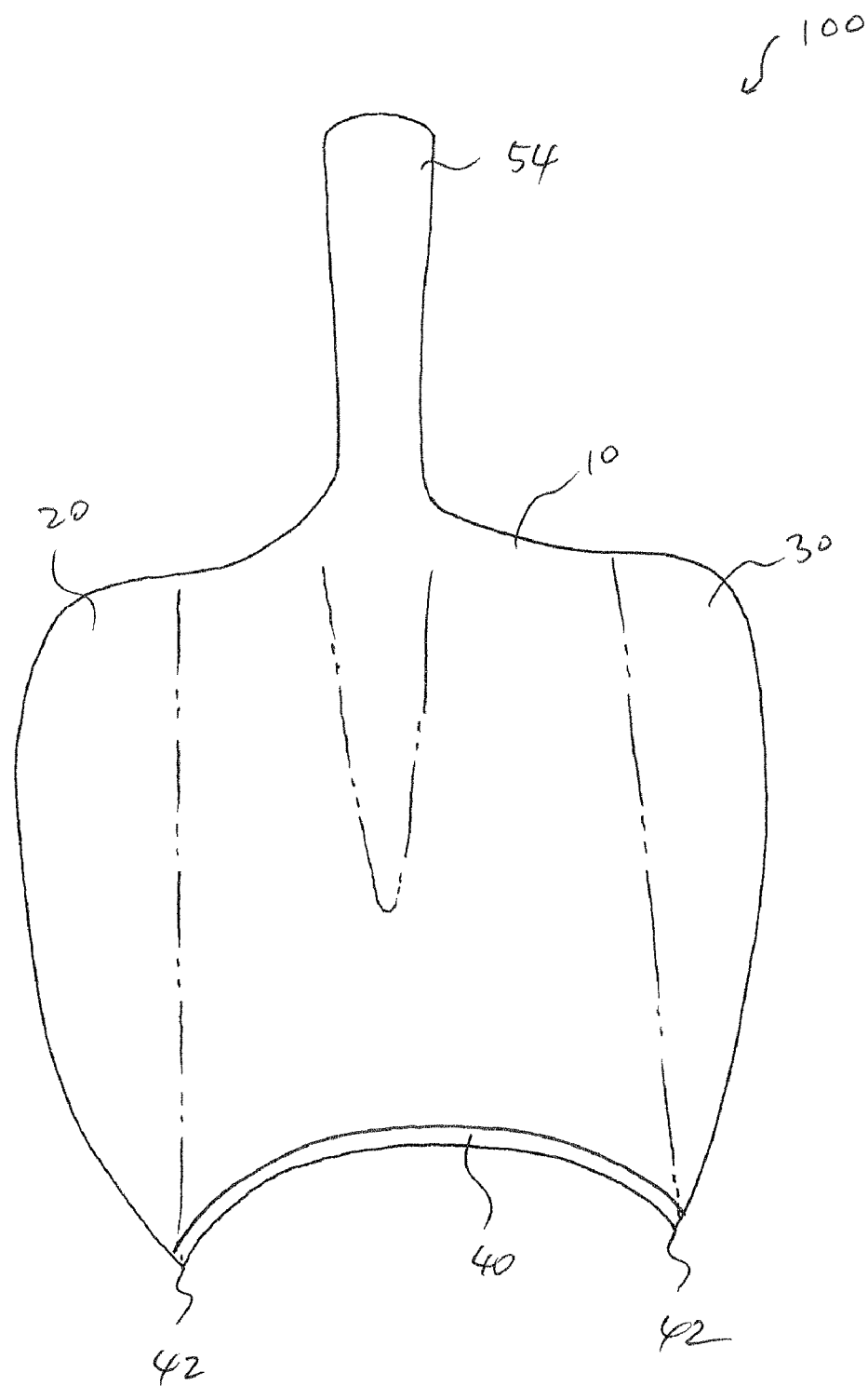
FIG. 4 is a front plan view showing a retreating crescent blade.

The retreating crescent blade 40 may comprise two pointed tips 42 on both sides thereof as shown in FIG. 4.

Figure 6:
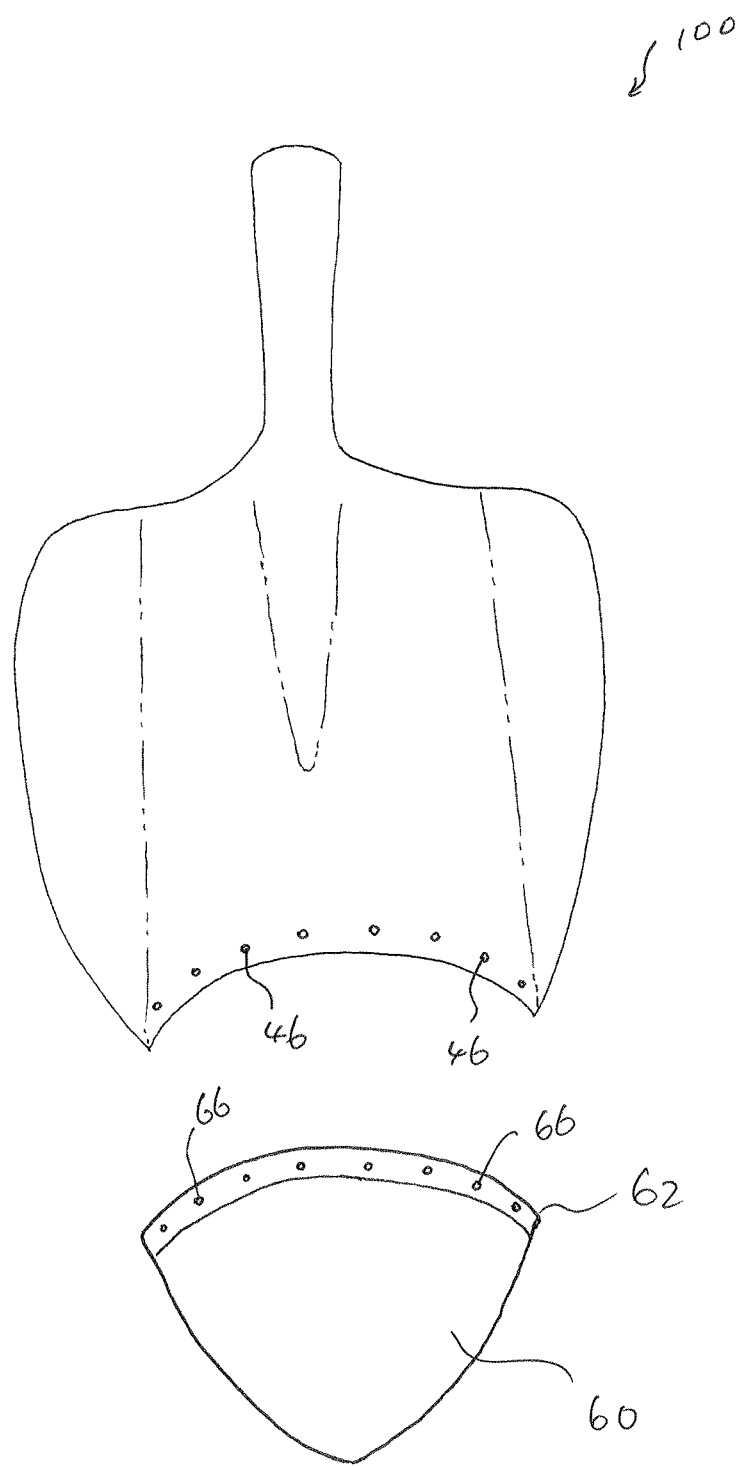
FIG. 6 is a perspective view of a multi-purpose spade according to another embodiment of the invention.
Figure 7:
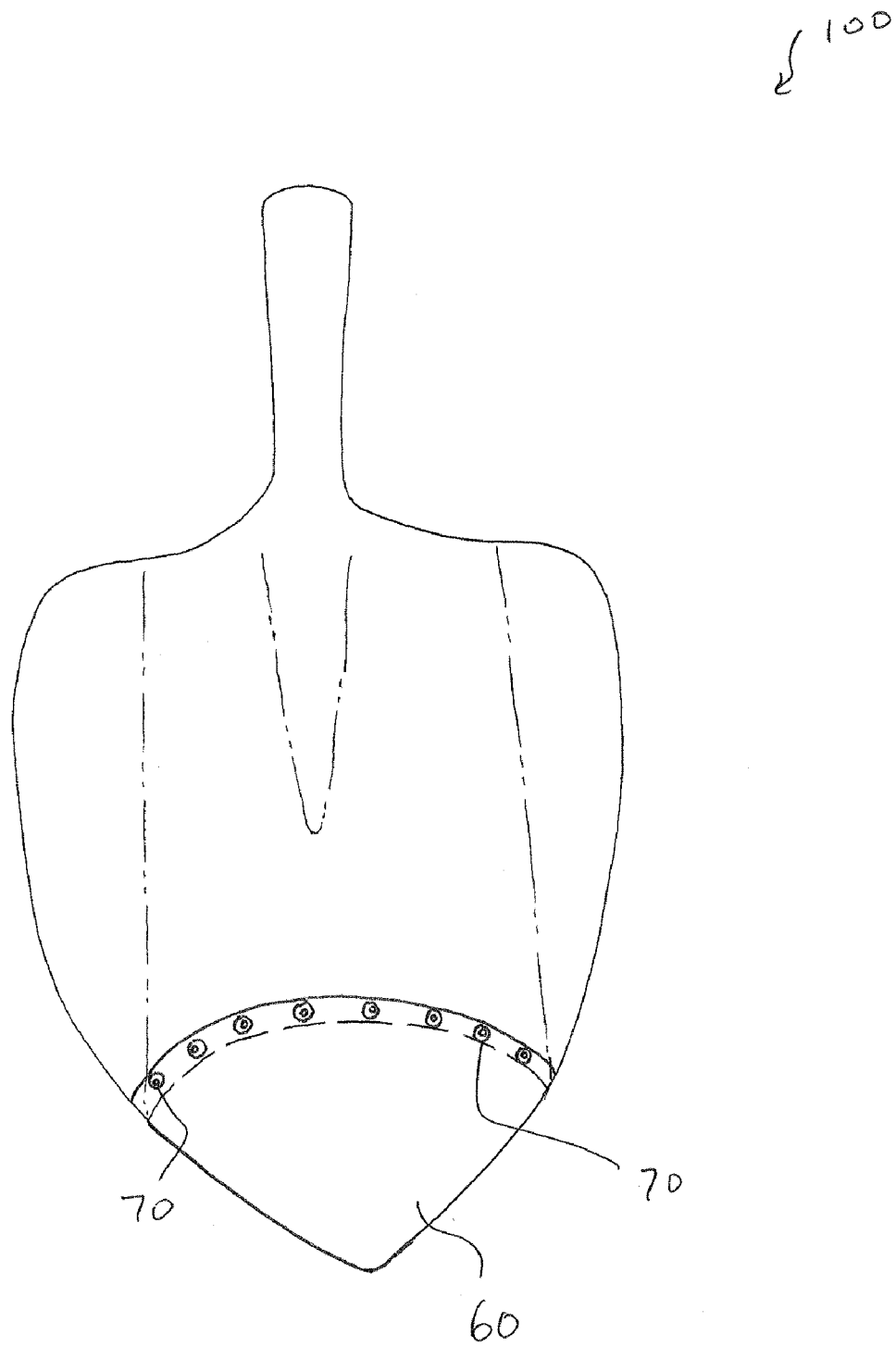
FIG. 7 is a perspective view showing assembled multi-purpose spade of FIG. 6.
Figure 8:
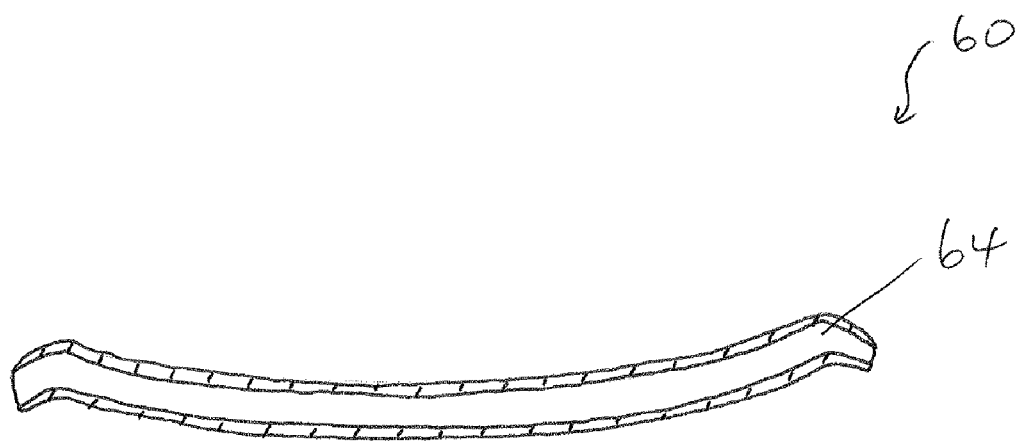
FIG. 8 is a top plan view of a retreating crescent blade.

The multi-purpose spade 100 may further comprise an extending blade 60 configured to be connected to the retreating crescent blade 40, and the extending blade 60 may comprise a connecting edge 62 as shown in FIGS. 6-8.

The extending blade 60 may comprise an accepting slot 64 between top and bottom surfaces along the connecting edge 62, and the accepting slot 64 may be configured to accept the retreating crescent blade 40 as shown in FIGS. 6-8.

The accepting slot 64 may comprise a plurality of first mechanical fasteners 66 along the top and bottom surfaces. The retreating crescent blade 40 may comprise a plurality of second mechanical fasteners 46 as shown in FIG. 6. The first mechanical fasteners 66 may comprise a plurality of first holes. The second mechanical fasteners 46 may comprise a plurality of second holes.

The multi-purpose spade 100 may further comprise a plurality of bolts and nuts 70 for fastening the plurality of first holes and the plurality of second holes as shown in FIG. 7.

Figure 9:
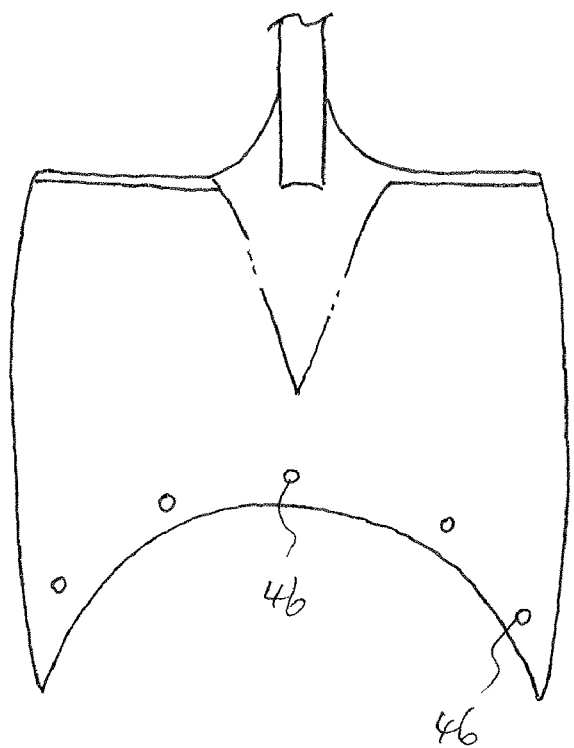
FIG. 9 is a perspective view of second mechanical fasteners according to another embodiment of the invention.
Figure 10:
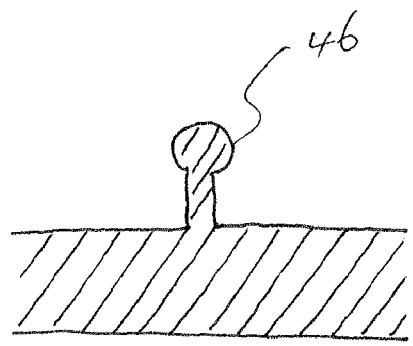
FIG. 10 is a cross-sectional view of a locking bolt in FIG. 9.
Figure 11:
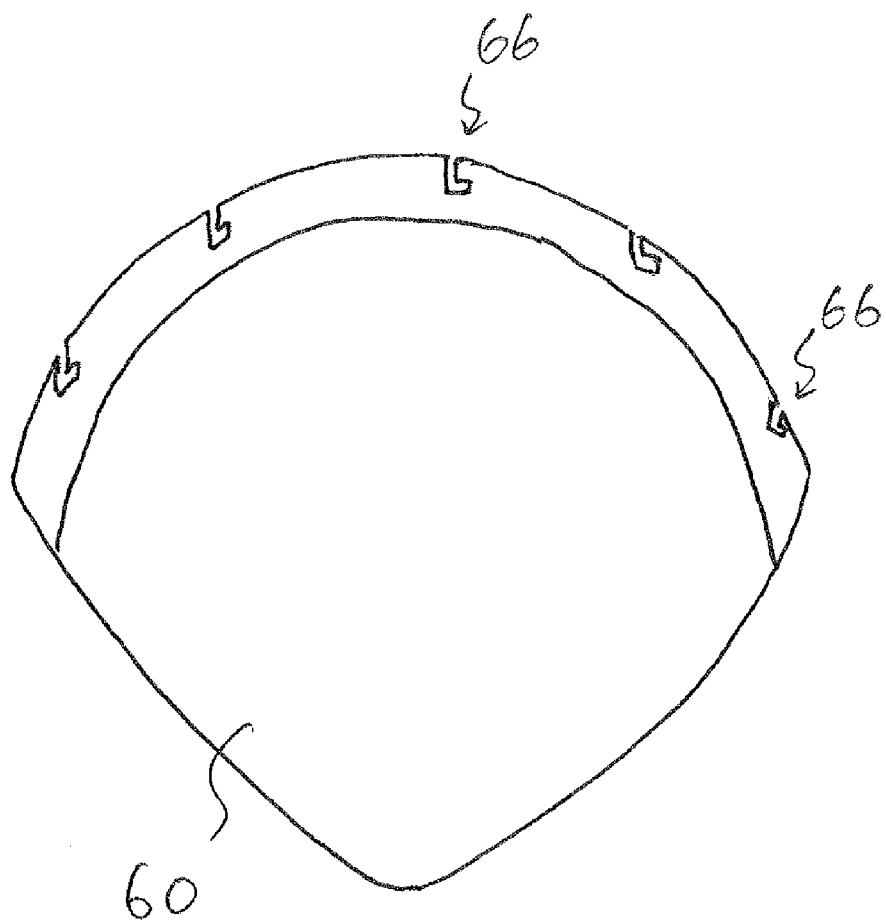
FIG. 11 is a perspective view of locking slots for the first mechanical fasteners.

In certain embodiments as shown in FIGS. 9-11, the second mechanical fastener 46 may comprise locking bolt extending from the top surface of the central plate or the first and second edge plate, and the first mechanical fastener 66 comprises an L-shaped locking slot on the top surface of the connecting edge, such that the locking bolt is configured to slide into the L-shaped locking slot and rotate by a predetermined angle to lock in.

Another aspect of the invention provides a multi-purpose spade comprising:

a central plate 10 comprising top surface and bottom surfaces, side portions, tip portion, and a treading portion, wherein the central plate is generally concave;

a first edge plate 20 comprising top and bottom surfaces, a first edge portion, an inner side portion, a tip portion, and a treading portion;

a second edge plate 30 comprising top and bottom surfaces, a second edge portion, an inner side portion, a tip portion, and a treading portion;

a retreating crescent blade 40 formed along the tip portions of the central plate and the first and second plates; and an extending blade 60 configured to be connected to the retreating crescent blade, wherein the extending blade comprises a connecting edge, and wherein the extending blade comprises an accepting slot between the top and bottom surfaces along the connecting edge, and wherein the accepting slot is configured to accept the retreating crescent blade, wherein the inner edge portions of the first and second plates are connected to corresponding side portions of the central plate with a predetermined angle so as to form two crest portions on the front surfaces along the side portions of the central plate.

In certain embodiments of the invention, the retreating crescent blade 40 may have a shape different from the generally crescent shape such as trapezoidal shape, circular shape, angular shape as a part of octagon.

The first and second mechanical fasteners 46, 66 may comprise other types such as rivet. The retreating crescent blade 40 may be thin enough, such that the resulting thickness of the connecting edge portion is not very different from the other portion. In certain embodiments of the invention, the thickness of the connecting edge portion is substantially same as that of other portions of the blade.

The multi-purpose spade according to embodiments of the invention is suitable to transplant flowers, vegetables, trees, etc. easily without hurting their roots. Due to the pointed tips of the crescent shape, it is pretty easy to break up soil and penetrate ever hard soil almost vertically. Furthermore, the multi-purpose spade is suitable to cut up tangled roots of weeds, vegetables, flowers, trees, etc.

Still another aspect of the invention may comprise another types of spades such as a square spade or shovel and a garden trowel.

The replaceable extending blade 60 can be easily locked and unlocked. The first and second mechanical fasteners 46, 66 can be locked and unlocked by kicking with a foot or striking against a hard surface such as earth or rock.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A multi-purpose spade comprising:
a central plate comprising top surface and bottom surfaces, side portions, tip portion, and a treading portion, wherein the central plate is generally concave;
a first edge plate comprising top and bottom surfaces, a first edge portion, an inner side portion, a tip portion, and a treading portion;
a second edge plate comprising top and bottom surfaces, a second edge portion, an inner side portion, a tip portion, and a treading portion;
a retreating crescent blade formed along the tip portions of the central plate and the first and second plates; and
an extending blade configured to be connected to the retreating crescent blade, wherein the extending blade comprises a connecting edge which has a crescent shape corresponding to the retreating crescent blade,
wherein the inner edge portions of the first and second edge plates are connected to corresponding side portions of the central plate with a predetermined angle so as to form two crest portions on the front surfaces along the side portions of the central plate,
wherein the extending blade comprises an accepting slot between the top and bottom surfaces along the connecting edge, and wherein the accepting slot is configured to accept the retreating crescent blade,
wherein the accepting slot comprises a plurality of first mechanical fasteners along the top and bottom surfaces, and wherein the retreating crescent blade comprises a plurality of second mechanical fasteners,
wherein the second mechanical fastener comprises locking bolt extending from the top surface of the central plate or the first and second edge plate, wherein the first mechanical fastener comprises an L-shaped locking slot on the top surface of the connecting edge, and wherein the locking bolt is configured to slide into the L-shaped locking slot and rotate by a predetermined angle to lock in, such that the first and second mechanical fasteners are locked and unlocked conveniently.

2. The multi-purpose spade of claim 1, wherein the central plate is approximately 2.0 to 7.0 times as wide as one of the first and second edge plates.

3. The multi-purpose spade of claim 2, wherein the central plate is approximately 5.0 times as wide as one of the first and second edge plates.

4. The multi-purpose spade of claim 1, wherein a portion of the central plate is convex.

5. The multi-purpose spade of claim 4, further comprising:
a handle acceptor provided around a middle point of the treading portion of the central plate; and
a handle fixed to the handle acceptor.

6. The multi-purpose spade of claim 5, wherein the handle acceptor extends from the convex portion of the central plate.

7. The multi-purpose spade of claim 1, wherein the first edge portion of the first edge plate extends generally in a direction parallel to a line connecting tips of the two crest portions.

8. The multi-purpose spade of claim 1, wherein the second edge portion of the second edge plate extends generally in a direction parallel to a line connecting tips of the two crest portions.

9. The multi-purpose spade of claim 1, wherein at least one of the first and second edge plates comprises a sharp edge along the first or second edge portion configured for cutting weeds or branches.

10. The multi-purpose spade of claim 1, wherein at least one of the first and second edge plates comprises a plurality of saw-teeth along the first or second edge portion configured for cutting weeds or branches.

11. The multi-purpose spade of claim 1, wherein the central plate, the first and second edge plates, and the retreating crescent blade are integrated into a single body.

12. The multi-purpose spade of claim 1, wherein the retreating crescent blade comprises two pointed tips on both sides thereof.

* * * * *